(12) United States Patent
Miyasaka (10) Patent No.: US 6,431,641 B2
(45) Date of Patent: Aug. 13, 2002

(54) FRAME STRUCTURE FOR VEHICLE

(75) Inventor: Hiroyuki Miyasaka, Kanagawa-ken (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/795,086

(22) Filed: Mar. 1, 2001

(30) Foreign Application Priority Data

Mar. 15, 2000 (JP) ........................................ 2000-072434

(51) Int. Cl.[7] .......................... B62D 21/15; B62D 21/00
(52) U.S. Cl. ................ 296/203.03; 296/204; 296/209; 296/189
(58) Field of Search ............................... 296/204, 209, 296/203.03, 188, 189; 180/311

(56) References Cited

U.S. PATENT DOCUMENTS

| | | | | |
|---|---|---|---|---|
| 2,216,120 A | * | 10/1940 | Ledwinka | 296/204 |
| 2,268,291 A | * | 12/1941 | Ledwinka et al. | 296/204 |
| 3,073,647 A | * | 1/1963 | Beltz | 296/204 |
| 3,110,518 A | * | 11/1963 | Wessells, III | 296/204 |
| 3,419,303 A | * | 12/1968 | Eggert, Jr. et al. | 296/204 |
| 4,014,587 A | * | 3/1977 | Eggert, Jr. | 296/204 |
| 5,002,333 A | * | 3/1991 | Kenmochi et al. | 296/204 |
| 5,338,080 A | * | 8/1994 | Janotik et al. | 296/204 |
| 5,352,011 A | * | 10/1994 | Kihara et al. | 296/204 |
| 5,577,797 A | * | 11/1996 | Takanichi | 296/204 |
| 5,765,906 A | * | 6/1998 | Iwatsuki et al. | 296/209 |
| 5,921,618 A | * | 7/1999 | Mori et al. | 296/188 |
| 5,944,377 A | * | 8/1999 | Vlahovic | 296/204 |
| 2001/0028179 A1 | * | 10/2001 | Takemoto et al. | 296/204 |

FOREIGN PATENT DOCUMENTS

JP   11-272994   8/1999

\* cited by examiner

Primary Examiner—Joseph D. Pape
Assistant Examiner—Hilary Gutman
(74) Attorney, Agent, or Firm—McDermott, Will & Emery (57) ABSTRACT

A frame structure capable of increasing collision energy absorption includes a floor member or structure. The floor member has extruded side sill members which are adapted to undergo lateral buckling in response to side collisions while resisting axial or longitudinal deformation due to end-on collisions. Extruded impact dispersing deformable sections with a smaller rigidity than the associated side sills are provided on the inboard sides of the sills and arranged to smooth buckling and disperse collision energy. At least one extruded, flat, passenger occupancy floor section, which is located inboard of the impact dispersing deformable sections, is provided to prevent buckling deformation and maintain the cabin space.

23 Claims, 11 Drawing Sheets

| TUNNEL SECTION (SECT. A) | PLANE SECTION FOR PASSENGERS (SECT. B) | DEFORM. ALLOWABLE SECTION (SECT. C) | SIDE SILL SECTION (SECT. D) |
|---|---|---|---|
| • TO ABSORB ENERGY AND REDUCE SHOCK DUE TO ITS DEFORMING BY FORTH/BACK DIRECTIONAL LOAD<br><br>• TO ENSURE SPACE UNDER TUNNEL PART | • TO ENSURE REGULAR SPACE WITHOUT BEING DEFORMED BY FORTH/BACK AND RIGHT/LEFT INPUTS | • TO ABSORB ENERGY AND REDUCE SHOCK DUE TO ITS DEFORMING BY WIDTH-DIRECTIONAL (LATERAL) INPUT<br><br>• TO HAVE SMALLER STRENGTH THAN SIDE SILL PART IN ORDER TO REDUCE MOMENT OCCURRED IN CENTER PILLAR THEREBY TO BE BUCKLED AT CONSTANT REACTIVE FORCE | • TO ENHANCE ITS CONTRIBUTION TO BODY RIGIDNESS THEREBY TO IMPROVE ITS RIGIDNESS AGAINST BENDING DUE TO HIGH CONTRIBUTION<br><br>• TO ABSORB ENERGY AT LATERAL INPUT<br><br>• NOT DEFORMED IN ORDER TO ENSURE CABIN SPACE AT FRONT INPUT |
| • TO ESTABLISH ENERGY ABSORBER AT FRONT END OF TUNNEL PART | • TO ENSURE RIGIDNESS AGAINST FRONT/LATERAL INPUTS | • TO ESTABLISH ENERGY ABSORBER AGAINST LATERAL INPUT<br><br>• TO REGULATE FLOOR REACTIVE FORCE IN PROCESS OF DEFORMING FROM SECT. D TO SECT. C | • TO ENSURE RIGIDNESS AGAINST BENDING<br><br>• TO ESTABLISH ENERGY ABSORBER AGAINST LATERAL INPUT<br><br>• TO ENSURE STRENGTH AND PREVENT ITS DEFORMATION AT FRONT INPUT |

REQUIRED PROPERTY

FIG.6

| | | PLATE THICKNESS (t) | RIB | PROFILE OF CROSS SECTION (h) |
|---|---|---|---|---|
| SECT. A (TUNNEL SECTION) | | TO THIN → TO ABSORB ENERGY DUE TO ITS DEFORMATION BY FRONT INPUT | | TO LOWER CROSS-SECTIONAL HEIGHT AS POSSIBLE THEREBY TO ENSURE SPACE→TO IMPROVE DEGREE OF FREEDOM FOR LAYOUTS OF DRIVE SYSTEM, MUFFLER, etc. |
| SECT. B (PASSENGER'S PLANER SECTION) | | GENERALLY SIMILAR TO OR MORE THAN THICKNESS OF SECT. C →TO ENSURE REGULAR SPACE WITHOUT BEING DEFORMED BY FORTH/BACK AND RIGHT/LEFT INPUTS | EFFECTIVE REINFORCEMENT BY PLURAL RIBS → TO ENSURE REGULAR SPACE WITHOUT BEING DEFORMED BY FORTH/BACK AND RIGHT/LEFT INPUTS | TO LOWER CROSS-SECTIONAL HEIGHT AS POSSIBLE THEREBY TO ENSURE SPACE→TO IMPROVE DEGREE OF FREEDOM FOR LAYOUTS OF PIPING etc. |
| SECT. C (DEFORM. ALLOWABLE SECTION) | $C_2$ | $t_1 > t_2$ TO BE LESS THAN STRENGTH OF SECT. D →DUE TO CONSTANT REACTIVE FORCE AT DEFORMING AGAINST LATERAL INPUT | | TO HEIGHTEN CROSS-SECTIONAL HEIGHT →TO ENSURE CLEARANCE TO STABILIZE BUCKLING OF UPPER/ LOWER WALLS AGAINST LATERAL INPUT (PREVENTION OF INTERFERENCE OF UPPER/LOWER WALLS) |
| | $C_1$ | $t_2 > t_3$ TO BE LESS THAN STRENGTH OF PART C2 →DUE TO CONSTANT REACTIVE FORCE AT DEFORMING AGAINST LATERAL INPUT | | TO HEIGHTEN CROSS-SECTIONAL HEIGHT →TO ENSURE CLEARANCE TO STABILIZE BUCKLING OF UPPER/LOWER WALLS AGAINST LATERAL INPUT (PREVENTION OF INTERFERENCE OF UPPER/LOWER WALLS) |
| SECT. D (SIDE SILL SECTION) | | TO THICKEN (ESPECIALLY, UPPER/LOWER FACE) →TO IMPROVE MEMBER'S RIGIDNESS AGAINST BENDING | VERTICAL RIBS → TO PREVENT DEFORMATION OF CROSS SECTION | TO HEIGHTEN CROSS-SECTIONAL HEIGHT → TO IMPROVE MEMBER'S RIGIDNESS AGAINST BENDING |

FRAME STRUCTURE FOR VEHICLE

BACKGROUND OF THE INVENTION

1. Field of the Invention

The present invention generally relates to a frame structure for a vehicle and, more particularly, to a frame or chassis arrangement having a floor structure formed from a corrosion resistant, lightweight extrudable material.

2. Description of the Related Art

Japanese Unexamined Patent Publication (kokai) No. 11-272994 discloses an automotive frame structure wherein a floor member is extruded from a lightweight metallic material, such as an aluminum alloy, so as to have elongated closed hollow cross-sections extending in the fore-and-aft (longitudinal) direction of the vehicle body. In this conventional frame structure, however, the extruded floor member has a constant closed cross-sectional height and a constant wall thickness. As a result, the strength/rigidity of the floor member tends not to satisfy impact deformation requirements.

SUMMARY OF THE INVENTION

It is an object of the present invention to provide a frame/chassis structure for a vehicle, including an extruded floor structure or member, that supplies the required strength/rigidity for the automotive body floor.

These and other objects of the invention are met by an embodiment of the invention which provides an extruded floor member having at least partially closed cross-sectional extrusion features extending in a longitudinal direction. The floor member includes a plurality of sections comprising a tunnel section having a first cross-sectional configuration; a side sill section having a second cross-sectional configuration; and a flat section having a first portion and a second portion. The first portion and the second portion are separated by a high-strength third portion. The flat section is interposed between the tunnel section and the side sill section so that the first portion is located adjacent the tunnel section. The first portion, second portion and the third portion each respectively have third, fourth and fifth cross-sectional configurations. The longitudinal rigidity of the side sill section in the longitudinal direction is higher than the tunnel section and the flat section. The lateral rigidity of the second portion of the flat section is smaller than the lateral rigidity of the side sill section, and the lateral rigidity of the first portion of the flat section is substantially equal to the lateral rigidity of the second portion of the flat section.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Preferred embodiments of the invention will be described with reference to the drawings, which are incorporated in and constitute a part of the specification, in which:

FIG. 6 is a table showing respective characteristics used to adjust the strength/rigidity of the respective sections of the first embodiment of the invention;

DESCRIPTION OF THE PREFERRED EMBODIMENT

Figure 1:
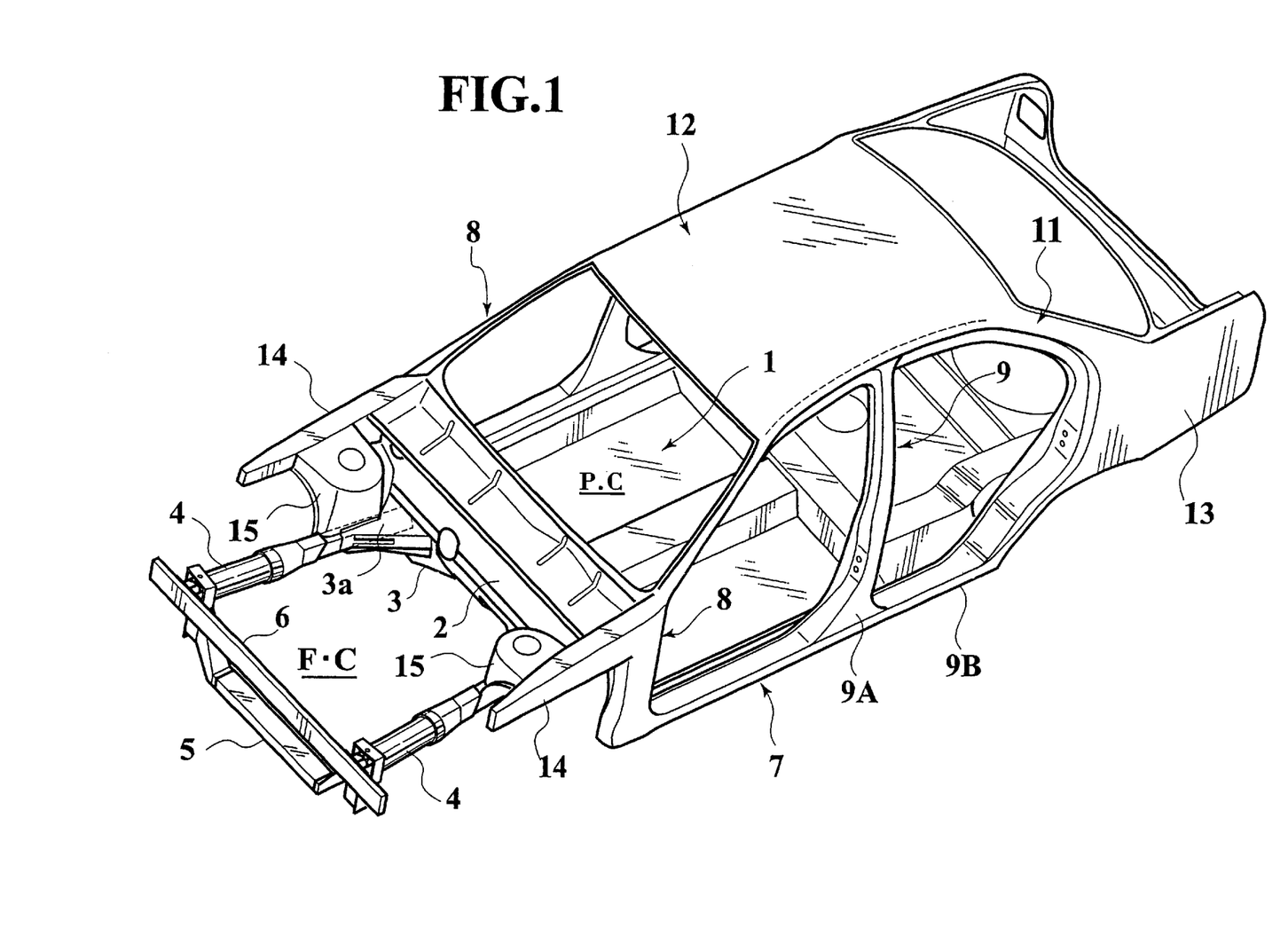
FIG. 1 is a perspective view of a vehicle chassis/frame in which the embodiments of the invention may be installed.
Figure 2:
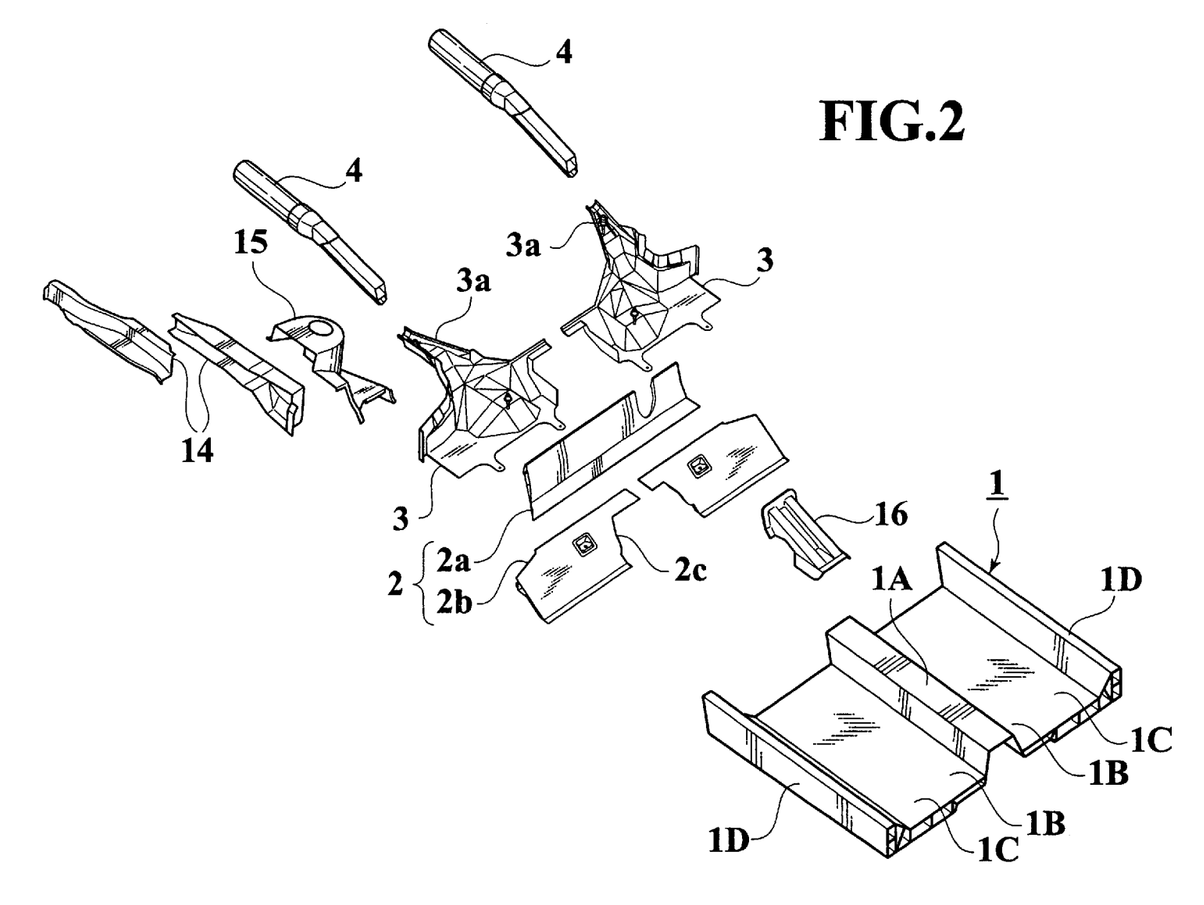
FIG. 2 is an exploded perspective of the chassis shown in FIG. 1 along with a floor member according to an embodiment of the invention.

Referring now to the drawings and initially to FIGS. 1 and 2, there will be seen a floor member or structure 1 and a dash cross-member 2 connected with the front end of the floor member 1. The dash cross-member 2 is composed of a vertical wall 2a and a toe/kick board or panel 2b with a notch 2c formed at a central portion. On both lateral sides of the dash cross member 2 there are a pair of dash reinforcement members 3, which include longitudinally extending arm members or parts 3a. A pair of front side members 4 are fitted and welded to the arm parts 3a, respectively.

The forward ends of the left and right front side members 4 are connected with each other by a first cross member 5 and a bumper armature 6. The front side members 4, the first cross member 5, and the bumper armature 6 partially define a front compartment FC. A hood ridge member 14 and a strut housing 15 are disposed on either side of the front compartment FC.

A pair of side sills 7 extend longitudinally along both sides of the vehicle and abut the outer portions of the floor member 1. A front pillar 8 is connected to the front ends of each of the side sills 7. A center pillar 9 is secured to the side sill 7 to define, at least partially, a body side. A roof panel 12 is connected to both the front pillars 8 and the center pillars 9. A rear fender 13 extends rearward from the roof panel 12. The passenger compartment PC is defined, at least partially, by the floor member 1, the side sills 7 the front pillar 8, the center pillar 9, the rear pillar 11, the roof panel 12, and the dash cross-member 2.

Figure 3:
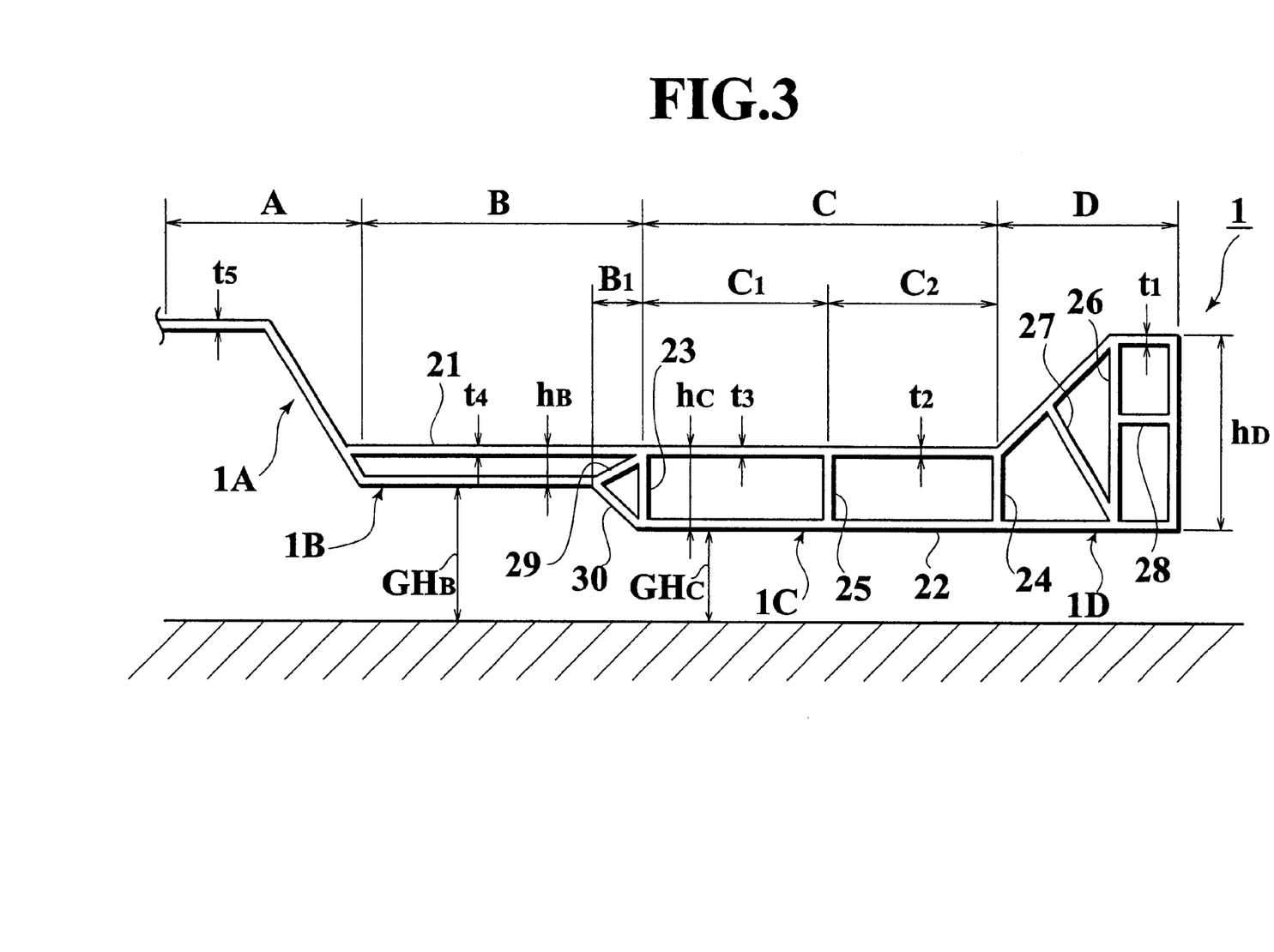
FIG. 3 is a sectional view of a floor structure according to a first embodiment of the invention.
Figure 4:
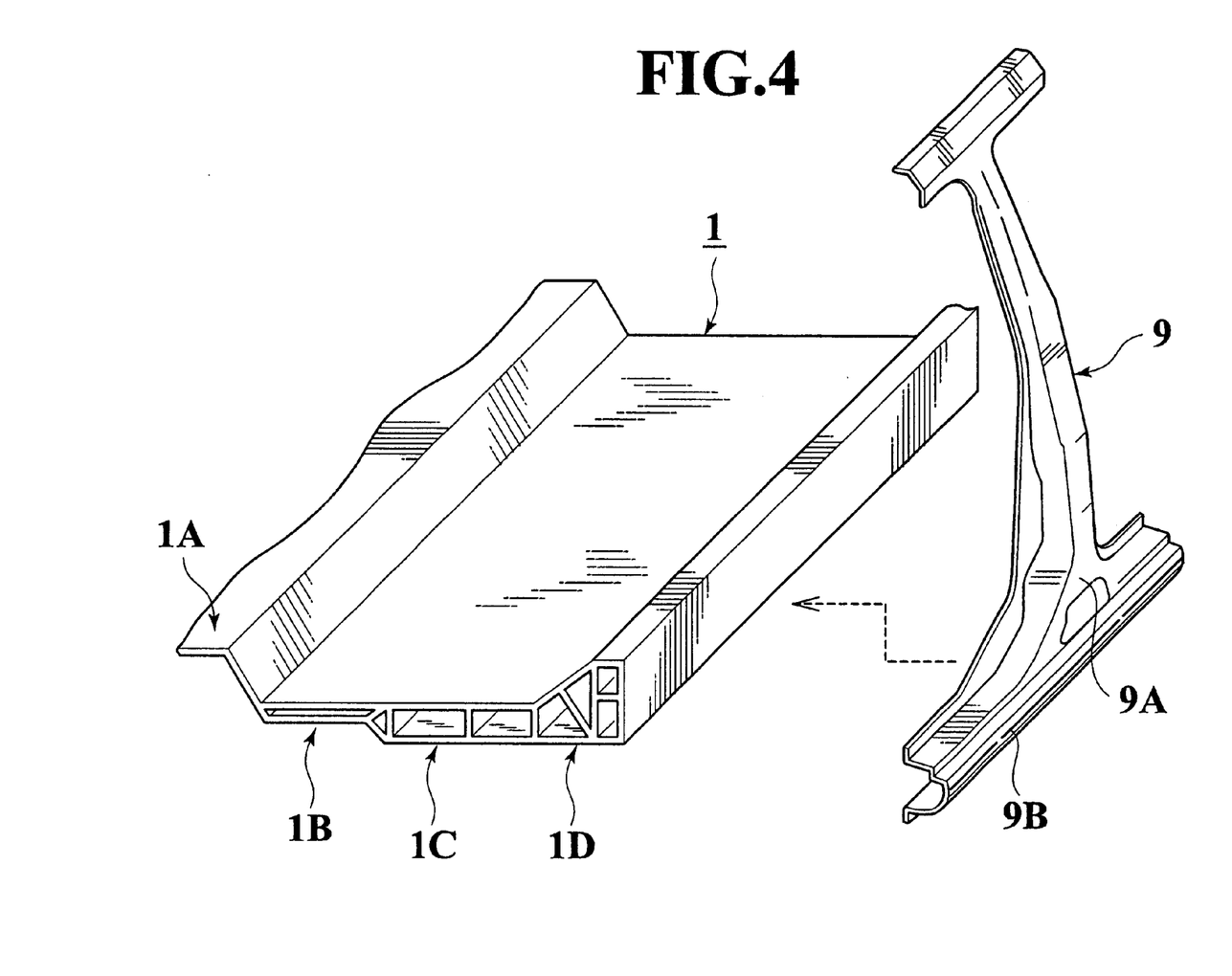
FIG. 4 is a perspective view of the first embodiment of the invention.

The above-mentioned floor member 1 is formed by extruding a corrosion resistant lightweight metallic material, such as an aluminum alloy, so that it has fore-and-aft (longitudinally) extending extrusion features. As shown in FIGS. 3 and 4, this extruded floor member 1 includes four sections—a tunnel member or section 1A, a first flat passenger occupancy floor section 1B, an impact dispersing deformable section (second flat deformation permitting section) 1C and a side sill member or section 1D. The deformable section or structure 1C allows the member 1 to be deformed in a controlled manner to a predetermined degree in the lateral direction of the vehicle as distinct from the fore-and-aft longitudinal direction, which is highly resisted. Sections 1A, 1B, 1C, 1D are arranged sequentially from the vehicle's (longitudinal) center line outward toward the outboard sides thereof.

The front end of the tunnel section 1A of the floor member 1 is engaged in the notch part 2c of the dash cross member 2. In addition to this, the forward ends of each of the other sections of the floor member 1, which are located on either side of the tunnel (viz., 1B, 1C and 1D), are abutted against and welded to rear edges of the kick board 2b.

The center pillar 9 is provided, on a lowermost end thereof, with a pillar base 9A and a sill outer 9B formed integrally (unitarily) with the base 9A. The sill outer 9B is welded to the outside or outboard face of the side sill member 1D. The side sill 7, thus, is comprised of the side sill member 1D and the sill outer 9B.

The following description relates to the body properties required for the tunnel section 1A, flat passenger occupancy floor section 1B, the impact dispersing deformable section 1C, and the side sill part 1D.

Tunnel Section 1A

The tunnel section 1A absorbs fore-and-aft direction collision energy. During a frontal or rear collision, the longitudinal ends of the tunnel section 1A buckle, thereby reducing the effect of the collision on the cabin occupants. The tunnel section 1A also provides sufficient space for the various exhaust components, such as an exhaust pipe, a muffler, etc. and various other under-floor parts, including drive shafts and the like. In other words, section 1A of the floor member 1 absorbs energy from a frontal or rear collision while maintaining a desired amount of under-tunnel space.

Flat Passenger Occupancy Floor Section 1B (1st flat section)

Each flat passenger occupancy floor section 1B maintains a constant cabin floor space. Each floor section 1B also is not deformed by impact resulting from a frontal or lateral collision. Section 1A, therefore, must have lower strength/rigidity with respect to both longitudinal and lateral impacts than section 1B.

Impact Dispersing Deformable Section (second flat deformable section) 1C

Each impact dispersing deformable section 1C, during a later collision, must absorb the energy generated by impact. The deformable sections 1C dissipate the energy by buckling in the lateral direction in a controlled manner, which results in a constant reactive force and which reduces the moment which is applied to the center pillar 9 and attenuates the tendency of this structural element to pivot. Thus, section 1C absorbs the lateral collision energy in a manner that provides a substantially constant crushing reaction during the buckling deformation in the vehicle's width direction.

Side Sill Section 1D

The side sill section or member 1D contributes considerably to the body rigidity and also exhibits a high resistance to bending. Additionally, section 1D deforms and buckles in response to a lateral impact such that the impact is reduced by absorption of collision energy. Section 1D also assures a constant cabin space and does not deform during a head-on/tail-on collision. In other words, the side sill member or section 1D must undergo bending and absorbs collision generated energy in response to a lateral impact while maintaining full rigidity with respect to longitudinally acting impact forces so as to prevent the axial deformation of the section.

Figure 5:
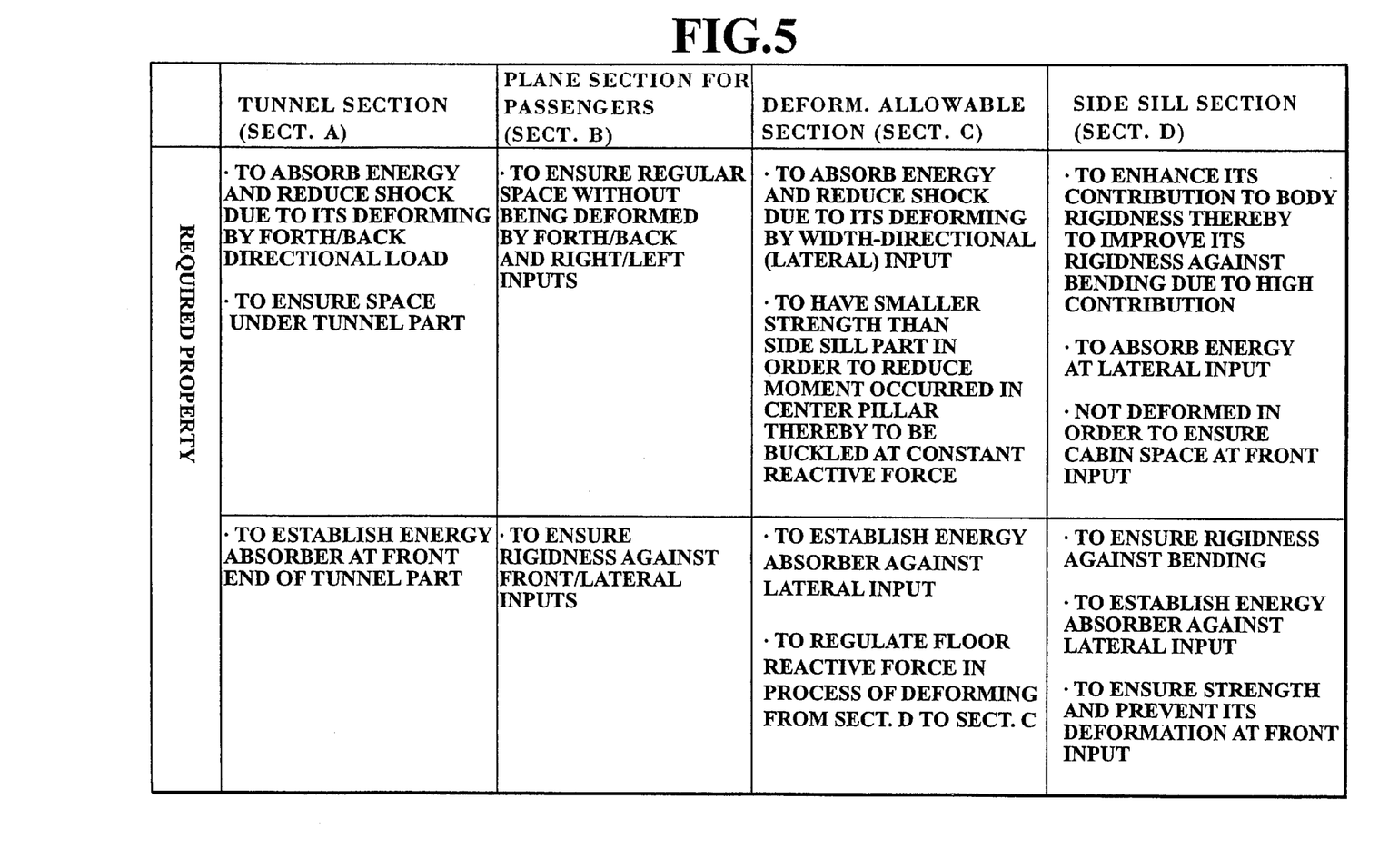
FIG. 5 is a table showing the properties required for respective sections of the first embodiment of the invention.

The above-mentioned properties required by sections 1A, 1B, 1C, 1D are shown in the table of FIG. 5. In view of these requirements, the floor member 1 in accordance with the first embodiment is constructed as follows. First, the floor member 1 is formed via extrusion by extruding the light weight corrosion resistant material in the longitudinal (or fore-and-aft) direction of the vehicle. While the following description is given as if the floor member 1 is extruded as a single unitary member, it should be kept in mind that it is within the scope of the present invention to make each of the above-mentioned sections individually and to weld or otherwise join the individual parts into a single integral/unitary structure.

The tunnel section 1A has only a single wall, while the passenger's plane section 1B, the impact dispersing deformable section 1C, and the side sill section 1D each have a plurality of closed cross-section extrusion features, that is, an upper wall 21, a lower wall 22, and a plurality of interconnecting ribs, including ribs 23 and 24.

Further, according to the first embodiment, the floor member 1 is constructed using a deformation/rigidity adjusting means/technique which allows for the rigidity and the associated deformation characteristics of the floor member 1 to be selectively adjusted on a location-by-location basis. More specifically, the use of the rigidity adjusting technique enables the deformation differential relationships to be adjusted/controlled.

The rigidity of the side sill section 1D in the fore-and-aft direction is higher than the other sections of the floor member 1. The rigidity of the impact dispersing deformable section 1C in the lateral direction is smaller than the rigidity of the side sill member/section 1D in the same direction. The lateral rigidity of the flat passenger occupancy floor section 1B is substantially equal to the rigidity of the impact dispersing deformable section 1C in the vehicle's lateral direction.

A high strength/rigidity section $B_1$ is formed along the outboard edge of each flat passenger occupancy floor section 1B. Although the lateral rigidity of this 'high strength' section $B_1$ is larger than that of the section C, the mean lateral rigidity of the whole section B is similar to or less than that of the section C.

As shown in FIG. 2, a load transmission member is disposed between a front end of the tunnel section 1A and the dash cross-member 2. As a result of this arrangement, during head-on collision, the collision load is effectively transmitted from the dash cross member 2 to the front end of the tunnel section 1A through the load transmission member 16, so that the front end of the tunnel section 1A is positively buckled in the longitudinal direction.

Further, to allow the impact dispersing deformable section 1C to be smoothly buckled in the lateral direction by the lateral impact, a vertical rib 25 extends longitudinally along the floor member at a location which is substantially the center of the section C. This divides section C into an inboard impact dispersing deformable section $C_1$ on the tunnel section 1A side of the rib 25, and an outboard impact dispersing deformable section $C_2$ on the side sill side of the rib. In addition to this, the lateral rigidity (resistance to lateral deformation) of the outboard part $C_2$ is arranged to be larger than that of the inboard part $C_1$.

To avoid the need for a separate/special reinforcement member, the rigidity is adjusted by adjusting one or more wall thickness (t) of the walls of the respective sections A to D; the profiles of the closed cross-sectional portions (e.g. heights $h_B$ to $h_D$) of the sections B, C, D; the adjustment of the above cross-sectional profiles via the provision of ribs 26, 27 in the closed cross-sections; or the mutual combination of the closed cross-sections. More specifically, each wall thickness $t_1$ of the inner and outer walls 21, 22 defining the section D is increased to raise the bending rigidity and the fore-and-aft directional rigidity.

In section C, the wall thickness $t_2$ of the inner and outer walls 21, 22 forming the part $C_2$ is smaller than the wall thickness $t_1$ of the section D. As a result, the rigidity of the part $C_2$ is smaller than that of section D which results in part $C_2$ laterally buckling under a generally constant crushing reaction (force). Similarly, the wall thickness $t_3$ of the part $C_1$ is smaller than the wall thickness $t_2$ of the part $C_2$. This causes the rigidity of the part $C_1$ to be smaller than that of the part $C_2$, which results in part $C_1$ laterally buckling under a generally constant crushing reaction (force).

In section B, the wall thickness $t_4$ of the walls 21, 22 is equal to or greater than the wall thickness $t_3$ of the part $C_1$ so as to leave a constant cabin space without being deformed by either frontal or lateral impact.

In section A, the wall thickness $t_5$ is equal to or less than the wall thickness $t_4$ of the walls 21, 22 that form section B and, as a result, frontal collision energy is absorbed via longitudinal buckling of the front end of the tunnel section 1A.

In summary, the following relationship is established for the wall thickness t.

$$t_1 > t_2 > t_3 t_4 t_5$$

The cross-sectional shapes of the respective sections are selected so that the cross-sectional height $h_D$ of each section D is the largest, which enhances its fore-and-aft rigidity. Although the sectional height $h_C$ of each section C (parts $C_2$, $C_1$) is smaller than the height $h_D$ of each section D, section C is formed with a relatively high height to provide a desired amount of clearance between the upper and lower walls 21, 22 to ensure lateral buckling deformation occurs without interference. To provide an adequate amount of installation space for various pipes, conduits, electrical harnesses, etc., under section B, the sectional height $h_B$ of section B is smaller than the sectional height $h_C$ of section C (Viz., B ($GH_B$) is higher than that of the section C ($GH_C$), where GH represents the ground height and clearance between the bottom surface of the corresponding section and the ground upon which the vehicle drives). The sectional height of section A corresponds to the wall thickness $t_5$ of the single wall and section A is configured to avoid any projections/obstructions on the inside of the tunnel section 1A, which increases the cross-sectional area of the tunnel section 1A to its maximum. Sections A and/or B are formed such that components, such as the exhaust pipe, muffler and a variety of functional parts (e.g. elements of the drive train), are easily installed. Accordingly, the following relationship is established among the sectional heights of sections 1D, 1C and 1B.

$$hD > hB > hC$$

The sectional height $h_D$ of section 1D is increased in comparison with the other heights, to increase its rigidity. Additionally, section 1D is provided, in its cross-section, with vertical ribs 26, 27 which connect the upper wall 21 with the lower wall 22, and a horizontal rib 28 which connects the rib 26 with the sidewall. In this arrangement, it is intended that the combination of the plurality of closed sub cross-sections defined by the ribs 26, 27 allows enhancement of both lateral bending rigidity and a longitudinal rigidity thereby preventing the deformation of the cross-sections caused by the frontal impact.

Additionally, the portion of the upper wall 21 which extends over section D is inclined with respect to the portion of the upper wall 21 which extends over section C, so that the lateral rigidity of the section D gradually decreases in the direction of section C.

The above mentioned rib 26 is arranged to vertically bridge the line of inflection (viz., the line along with the angle of the upper wall 21 changes from a horizontal state and begins to incline downwardly toward section C) and the lower wall 22, while the rib 27 is inclined so as to extend from the joint between the rib 26 and the lower wall 22, toward substantially a mid point of the inclined portion of the upper wall 21.

The 'high strength' section $B_1$, which is located at the boundary of section C and section B, is such that the rib 23 is connected with the lower wall 22 in the section B via two oblique ribs 29, 30. Consequently, a triangular truss is formed by three ribs 23, 29, 30 to reinforce the boundary part. As a result, the transfer of lateral buckling toward the section B owing to the formation of abrupt change in lateral rigidity is restricted.

The above-mentioned rigidity adjustment of the sections A, B, C, D are shown in the table of FIG. 6.

With the above-mentioned adjustment of rigidity, the physical properties of the sections A to D and the space efficiency in the circumference of floor (vicinities of upper and lower faces) are established as follows.

Bending rigidity: sec. A≦sect.B≦sect. C<sect. D

Longitudinal rigidity: sect. A<sect. B≦sect. C≦sect. D

Lateral rigidity: sect. A≦sect. B≦sect. C<sect. D

Space efficiency around floor: sect. A>sect. B>sect. C>sect. D

According to this embodiment, because the floor member 1 is comprised of an extrusion produced by extruding a material of the above-mentioned non-corrosive, lightweight nature, and wherein the extrusion features are arranged to extend in the vehicle's longitudinal direction and to additionally define closed cross-sections (except for tunnel section 1A), the chassis or frame structure of the invention exhibits an inherently high rigidity with respect to lateral bending and frontal impact. Particularly, because the side sill part 1D is formed with a longitudinal rigidity larger than any other sections 1A, 1B, 1C, the overall rigidity of the frame structure is enhanced through the provision of this essential floor framework member.

In addition, because the lateral rigidity of the impact dispersing deformable section 1C is smaller than that of the side sill part 1D, the part 1C smoothly buckles laterally inward in response to a side impact such that the collision energy is absorbed effectively to reduce the impact. On the other hand, because the lateral rigidity of the first flat passenger occupancy floor section 1B is substantially equal to that of the impact dispersing deformable section (second flat deformation permitting section) 1C, the deformation of section 1B is restricted due to an adequate resistance to a lateral impact which has been reduced by the buckling deformation of impact dispersing deformable section 1C. This enables a constant protective cabin space to be assured. In this way, it is possible to provide a frame structure capable of satisfying both the rigidity required as the automotive body floor as well as the physical properties required in connection with collision impacts to the vehicle's front (or rear) and lateral sides.

The manner in which the above-constructed frame structure behaves during impact will be described below with reference to FIGS. 7 to 10. Note that sections 1A, 1B, 1C and 1D will be also be referred to as simply sections A, B, C and D, in various instances to simplify the disclosure and to enable the concept of the invention to be rendered more apparent.

Figure 7:
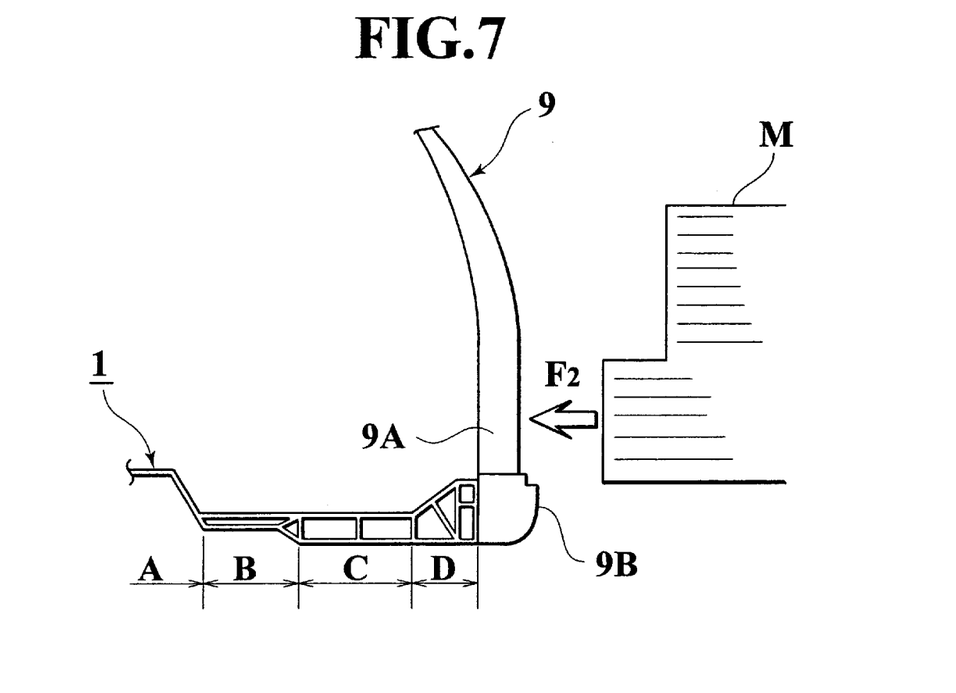
FIG. 7 is a schematic sectional view showing the floor structure according to the first embodiment of the invention prior to a side collision.
Figure 8:
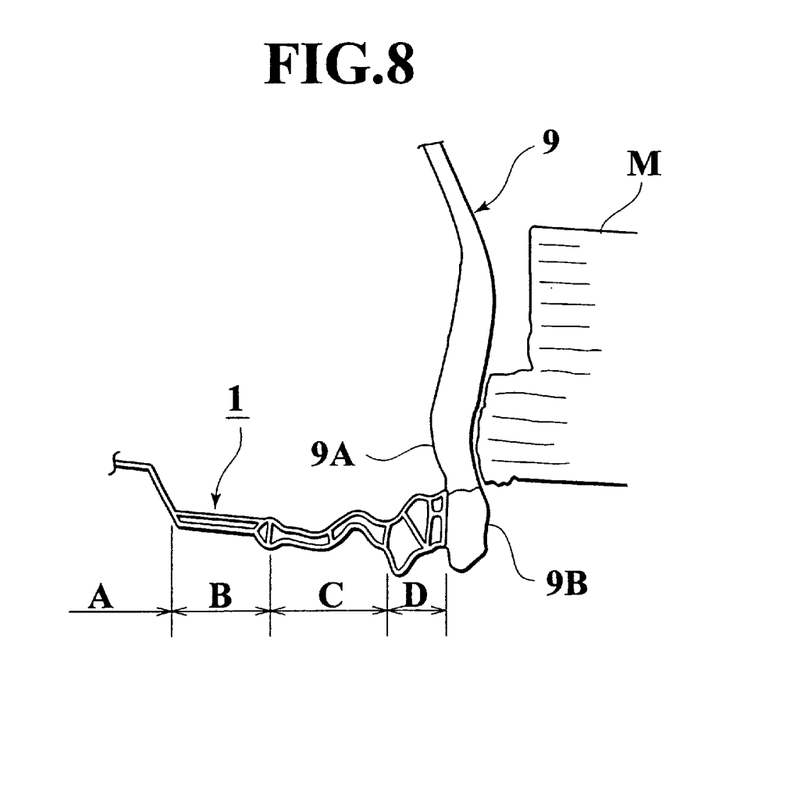
FIG. 8 is schematic sectional view showing the deformation of the floor structure shown in FIG. 7 which is produced by the side collision.

As shown in FIGS. 7 and 8, when a lateral impact force $F_2$ is exerted on the lateral side of the vehicle as the result of vehicle's collision with a moving object M, the force $F_2$ acts on the side sill member 1D of the floor member 1 through the center pillar 9, and the pillar base 9A. Force $F_2$ is then dispersed, like ripples in a pond, from the impact point on the side sill part 1D to the interior portions of the floor member 1. Thus, with respect to loads occurring in the respective sections, there exists a general relationship of: section A<section B<section C<section D.

Figure 9:
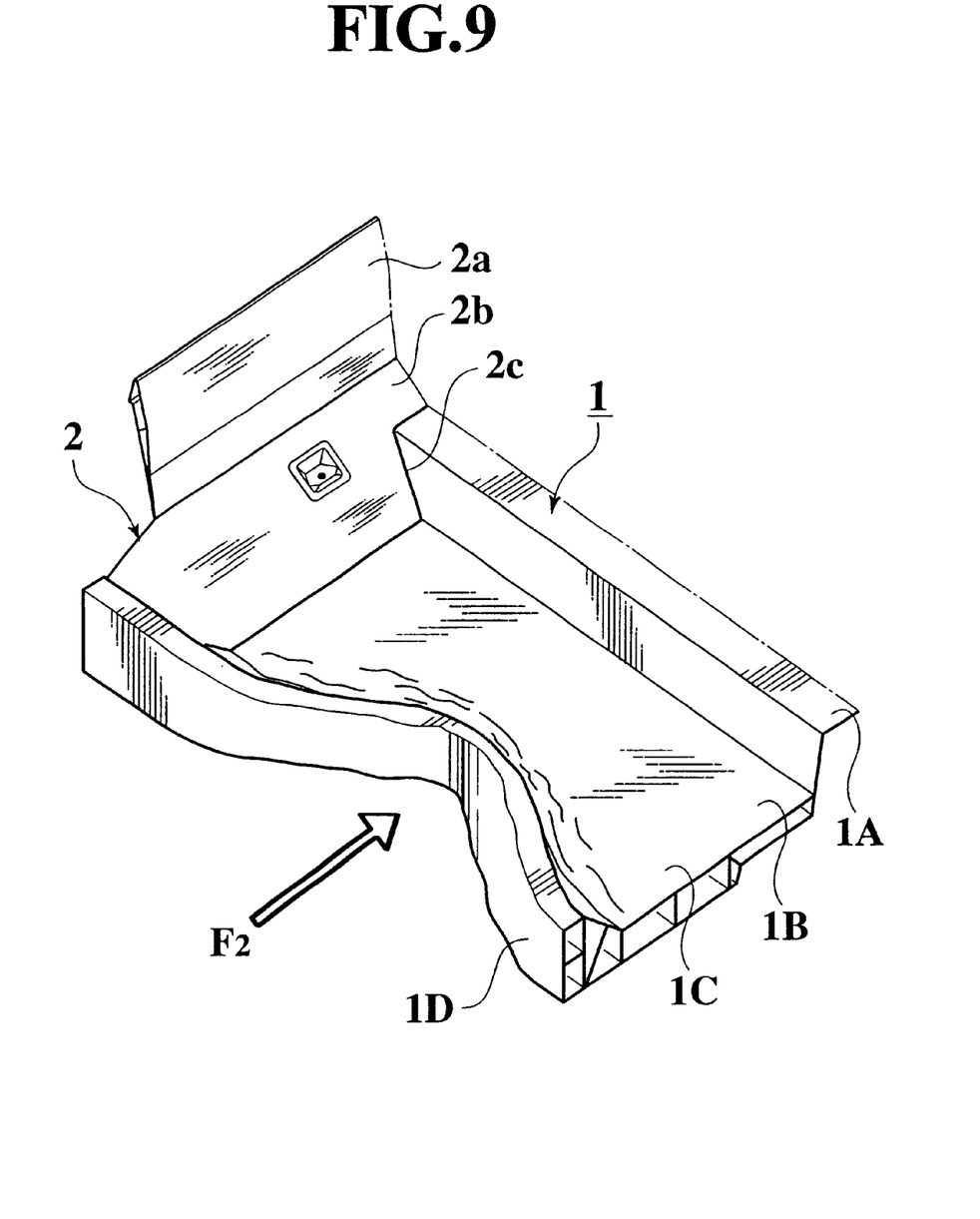
FIG. 9 is a perspective view depicting the deformation produced in the floor member according the first embodiment by the side impact depicted in FIG. 8.

The lateral rigidity of the floor member 1 is established with the previously-mentioned relationship of: section A<section B<section C<section D. Therefore, as shown in FIGS. 8 and 9, section D, which has a large rigidity, buckles first in the lateral direction to reduce an initial reaction. Subsequently, section C, which has a smaller rigidity than section D, buckles progressively over a widening front in the lateral direction of the vehicle. Thus, as a result of these buckling deformation characteristics, the collision energy is weakened to reduce the impact force. During the deformation of sections D and C, the lateral buckling deformations are carried out without interference between the upper wall 21 and the lower wall 22 as a result of the adequate clearances provided therebetween with the establishment of the heights $h_D$, $h_C$. Further, as section D has a portion whose lateral rigidity is gradually reduced in the direction of section C, it is possible to establish linear "reactive force" characteristics in the buckling deformation from section D to section C, while preventing the boundary between the sections D and C from being locally deformed due to a localized concentration of stress.

Further, as mentioned above, section C consists of the outboard part $C_2$ and the inboard part $C_1$. The lateral rigidity of the part $C_2$ is larger than that of the latter part $C_1$. Therefore, when the part $C_2$ stably buckles with a substantially constant crushing reactive force to weaken the impact force, the part $C_1$ is successively subjected to a stable buckling deformation with a substantially constant crushing reactive force without an accompanying rise in reactive force, and thus weakens the impact force. Thus, since the linear "reactive force" characteristics are attained through the buckling of part $C_2$ to the part $C_1$, it is possible to control the crushing reactive force of the whole section C and also the mode of deformation.

As a result, sections D, C buckle in the lateral direction continuously and stably thereby absorbing collision energy without increasing the moment generated in center pillar 9. Moreover, due to the triangular truss of ribs 23, 29, 30, which allows an abrupt increase in the lateral rigidity at the boundary between the sections C and B, the lateral buckling ceases in section C and prevents the deformation of section B, thereby assuring the maintenance of the vehicle cabin space.

Figure 10:
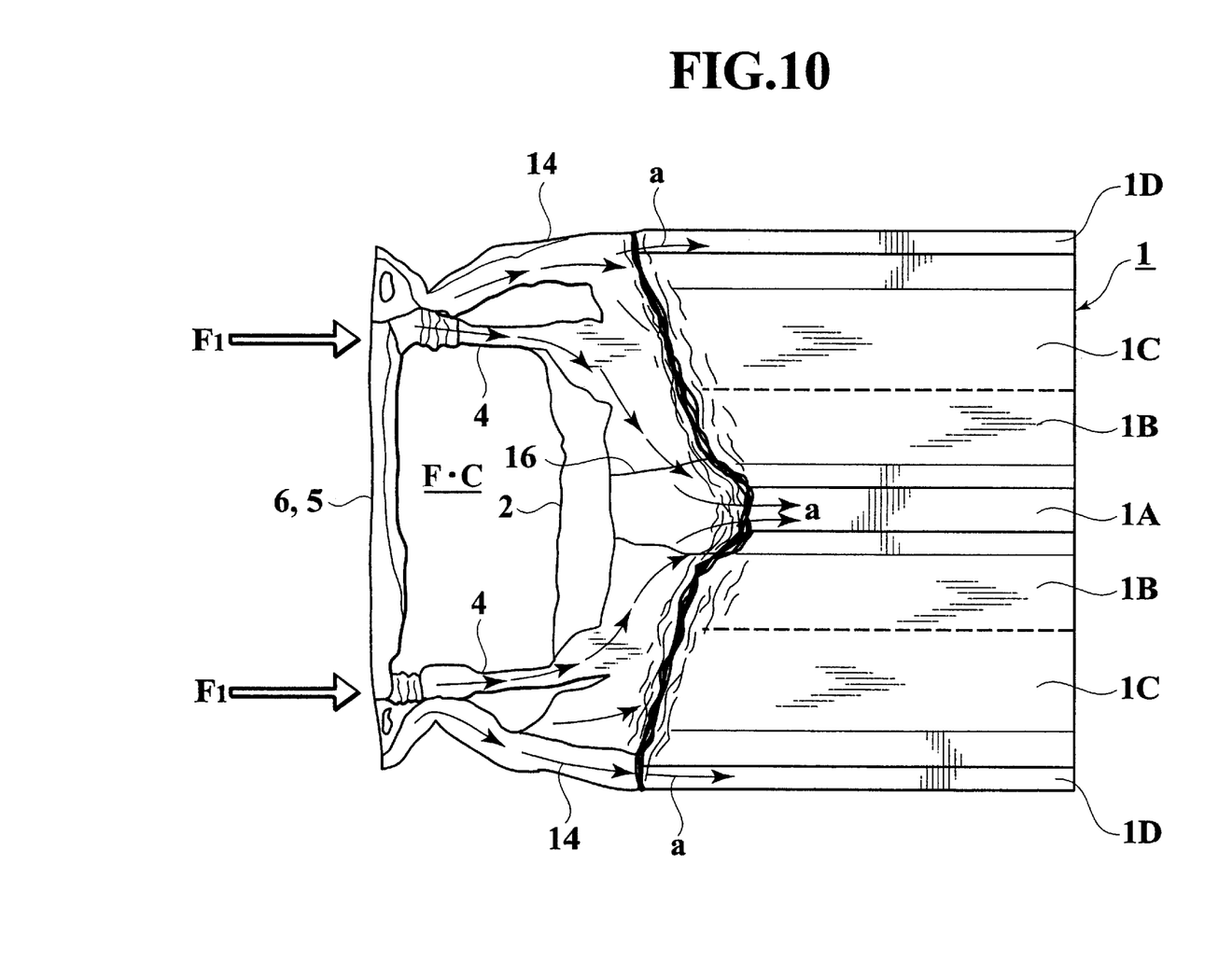
FIG. 10 is a schematic plan view depicting the deformation of the floor structure according to the present invention which is produced as a result of forward head-on collision.

During a full head-on collision, such as depicted in FIG. 10, frontal impact forces $F_1$ act on the dash cross member 2 through the front side member 4 and the hood ridge member 14. The thus transmitted impacts $F_1$ are also transmitted from the load transmission member 16 to the front end of the floor member 1 and the front end of the tunnel section 1A, which thus acts as a transmission center, as depicted by the arrows a.

As mentioned above, the tunnel section 1A has only a single wall construction as compared with the other sections B to D, which have closed cross-sections and wherein the fore-and-aft (longitudinal) rigidities are established to meet the above relationship (i.e. sect. A<sect. B≦sect. C≦sect. D) upon the establishment of the above relationship (i.e. $t_1>t_2>t_3t_4t_5$) in wall thickness (t). Accordingly, as shown in FIG. 10, the circumference of the tunnel section 1A only buckles in the fore-and aft direction, so that the collision energy can be absorbed to reduce the impact force and it is possible to restrict the deformation of the side sill part 1D exerting an influence on the movement of doors of the vehicle which are associated with at least the center pillar 9.

SECOND EMBODIMENT

Figure 11:
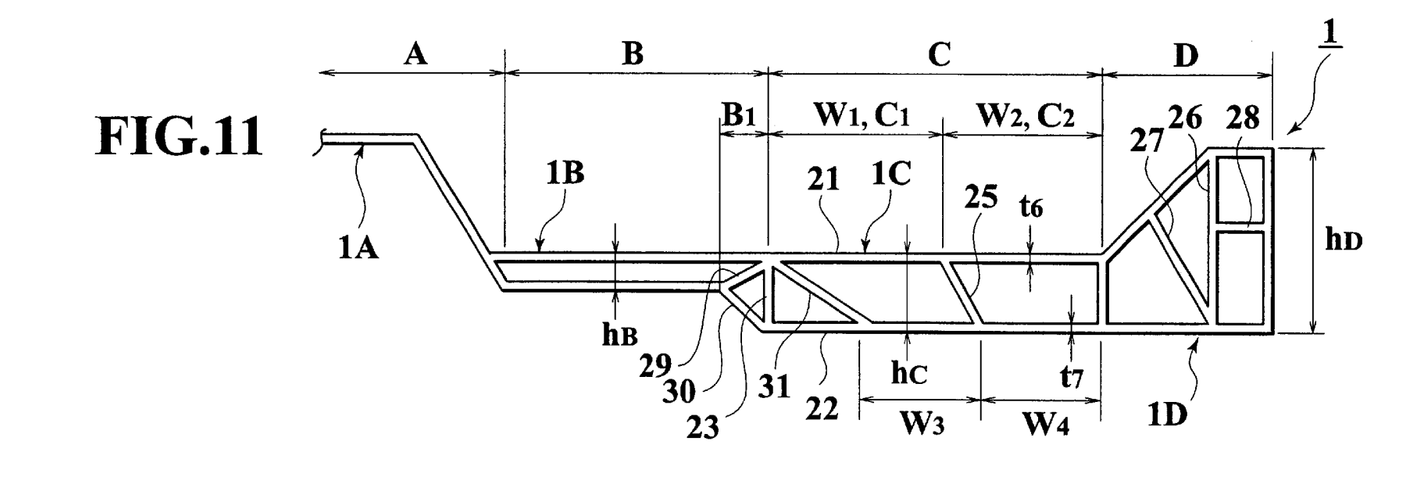
FIG. 11 is a sectional view showing a second embodiment of the invention.

FIG. 11 shows a second embodiment of the present invention. In this embodiment, the tunnel section 1A is also formed of a single wall, while the remaining parts 1B, 1C, 1D are respectively formed to have closed cross-sections composed of the upper and lower walls 21, 22, the partition ribs 23, 24, 25 and the reinforcement ribs 26 to 30. Further, the closed cross-sectional heights of sections B, C, D, are also such that $h_D>h_C>h_B$.

In the above-mentioned basic structure, the physical characteristics of sections A to D of the second embodiment are quite similar to the first embodiment. However, in section C, the wall thickness $t_6$ of the upper wall 21 in the section C is greater than the wall thickness $t_7$ of the lower wall 22 in the same section due to the requirements of floor rigidity against the seat loads ($t_6<t_7$).

In the case of different wall thicknesses t of the inner and outer walls 21, 22 in section C, it is necessary that the inner and outer walls 21, 22 are synchronously subjected to stable buckling deformation by lateral impact. On the other hand, the wall strengths that resist the buckling of parts $C_1$, $C_2$ are influenced by rib 25 and are proportional to the wall thickness (t) and are inversely proportional to the width W of the part. Therefore, the rib 25 is arranged obliquely with respect to the upper wall 21 and additionally, an oblique rib 31 is formed in the part $C_1$ so as to extend from the intersection of the rib 23 with the upper wall 21 toward the lower wall 22. Consequently, the small widths $W_3$, $W_4$ of the lower wall 22 are established in comparison with the widths $W_1$, $W_2$ of the upper wall 21 ($W_1$, $W_2>W_3$, $W_4$) so that the wide-directional buckling strength of the upper wall 21 in the section C is equal to that of the outer part 22.

Thus, similar to the first embodiment, even if the wall thickness $t_6$ of the upper wall 21 in the section C is larger than the wall thickness $t_7$ of the lower wall 22 in view of the rigidity required for the floor, the inner and outer walls 21, 22 can be synchronously subjected to stable buckling deformation in the respective parts $C_2$, $C_1$, thereby absorbing collision energy in a manner very similar to that of the first embodiment. It is to be noted that, in the above-mentioned embodiments, the distribution of lateral rigidity of the sections A to D, the variation characteristics of lateral rigidity of the sections A to D, the area of collision energy absorption of the sections A to D, and the absorption characteristics of the sections A to D can be optionally controlled by the adjustment of wall thickness of the respective sections, the ribs (number, interval, angle), the combination of profiles of closed cross-sections, etc.

THIRD AND FOURTH EMBODIMENTS

Figure 12:
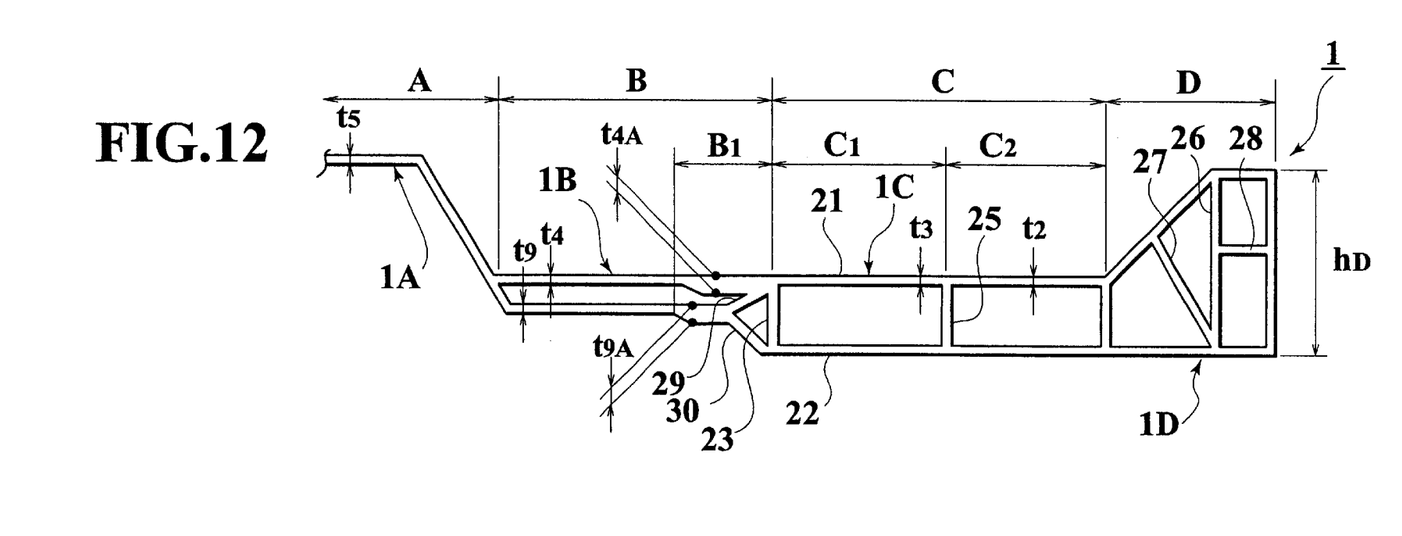
FIG. 12 is a sectional view showing a third embodiment of the invention.
Figure 13:
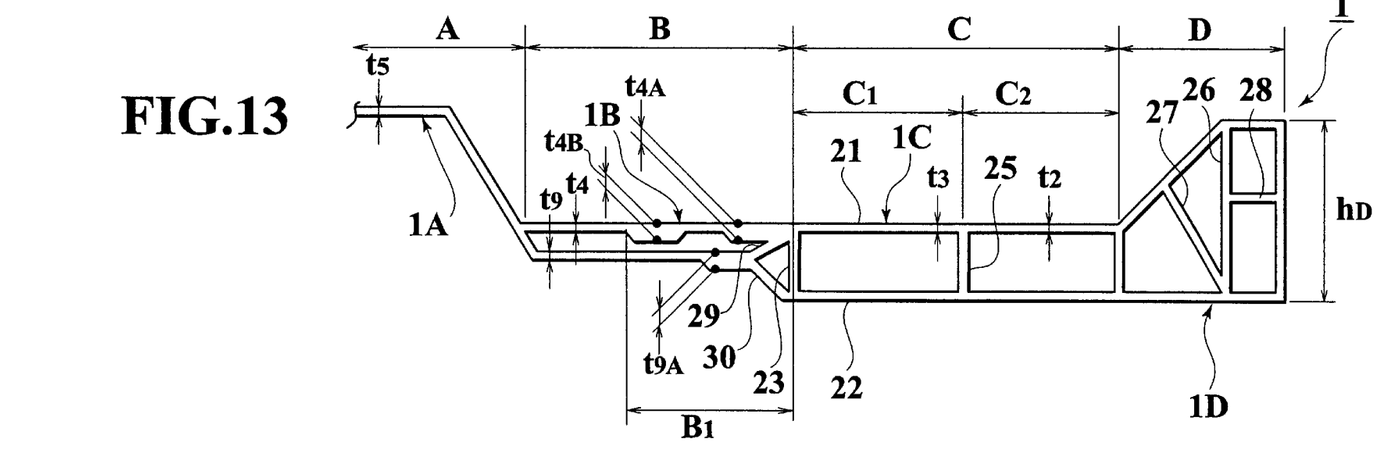
FIG. 13 is a sectional view showing a fourth embodiment of the invention.
Figure 14:
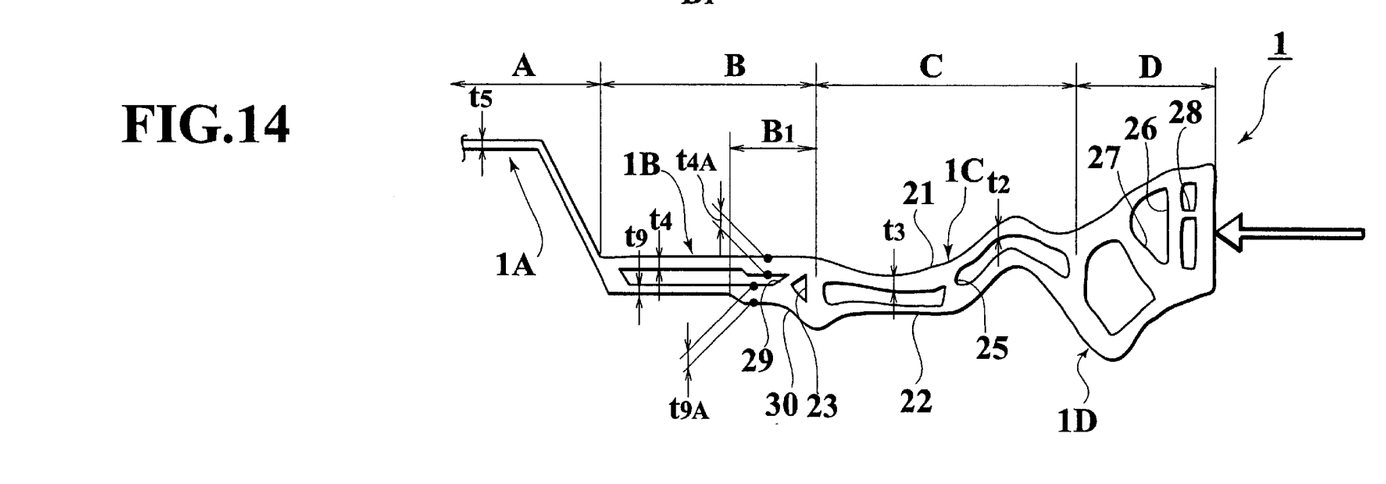
FIG. 14 is a sectional view showing the deformation produced in the third embodiment as a result of a side collision generated impact.

FIGS. 12 and 13 show modifications of the high-strength part $B_1$ while FIG. 14 shows the deformation produced by a side impact.

In FIG. 12, section B is formed so that the wall thickness $t_{4A}$, $t_{9A}$ of the high-strength part $B_1$ are larger than the wall thickness $t_4$, $t_9$ of the other parts except for the high strength part $B_1$. Also in FIG. 13, section B is formed so that the wall thickness $t_{4A}$, $t_{9A}$, $t_{9B}$ of the high-strength part $B_1$ is greater than the wall thickness $t_4$, $t_9$ of the other part which the exception of the high strength part $B_1$. However, the average lateral rigidity of the section B including the high-strength part $B_1$ is substantially similar to or less than that of the section C. As shown in FIG. 14, when the vehicle is subjected to side impact, the deformation is abruptly decreased upon reaching the outboard edge of the high-strength part/section $B_1$.

As mentioned above, the floor member is formed by extrusion so that the extrusion features extend in the fore-and-aft direction of the chassis, and include closed cross-sections. As a result, the frame structure exhibits an inherently high rigidity against bending impact generated by a frontal impact. Particularly, the side sill part exhibits a fore-and-aft rigidity which is larger than the same directional rigidity of the other sections, and enhances its function as an essential floor framework member.

In the impact dispersing deformable section, the rigidity in the vehicle's width direction is set to be smaller than that of the side sill part. Therefore, when the side sill part is buckled laterally inward by a side collision, the impact dispersing deformable section successively and smoothly buckles in the vehicle's width direction, so that the collision energy is spread radially outward and can be absorbed to reduce the impact force effectively. On the other hand, since the rigidity of the inboard flat passenger occupancy floor section in the lateral direction is generally similar to that of the outboard impact dispersing deformable section $C_1$ in the same direction, the deformation of the flat passenger occupancy floor section can be restricted owing to its adequate resistance to lateral impact which has been reduced by the buckling deformation of the impact dispersing deformable section.

In this way, it is possible to provide the frame structure capable of satisfying both rigidity required as the automotive body floor and physical properties required against the collision impacts through the vehicle's front and lateral sides.

The contents of Japanese Patent Application P2000-72434 on which the priority of this application and disclosure are based are incorporated herein by reference.

Although the invention has been described with reference to only a limited number of embodiments, the scope of invention is not limited thereto and is limited only by the appended claims. That is to say, various modifications and variations of the embodiment(s) described above will be readily self-evident to those skilled in the art to the present invention pertains given the preceding disclosure and thus the scope within which the variants can be developed are only limited by the following claims.

What is claimed is:

1. An extruded floor member having at least partially closed cross-sectional extrusion features extending in a longitudinal direction, the floor member including a plurality of sections comprising:

a tunnel section having a first cross-sectional configuration;

a side sill section having a second cross-sectional configuration; and a flat section having a first portion and a second portion, the first portion and the second portion being separated by a high-strength third portion, the flat section being interposed between the tunnel section and the side sill section so that the first portion is located adjacent the tunnel section, the first portion, second portion and the third portion each respectively having third, fourth and fifth cross-sectional configurations, wherein the longitudinal rigidity of the side sill section in the longitudinal direction is higher than the tunnel section and the flat section, the lateral rigidity of the second portion of the flat section being smaller than the lateral rigidity of the side sill section, and the lateral rigidity of the first portion of the flat section being substantially equal to the lateral rigidity of the second portion of the flat section.

2. The extruded floor member as claimed in claim 1, wherein the rigidity of the respective sections of the floor member is determined by one of the respective cross-sectional configuration and wall thickness of wall members which form parts of the first to fifth cross-sectional configurations.

3. The floor member as claimed in claim 1, wherein the rigidity of the respective sections of the floor member is determined by the wall thickness of walls of the respective sections.

4. The floor member as claimed in claim 3, wherein the wall thickness of an upper wall is greater than the wall thickness of a lower wall of the respective sections.

5. The floor member as claimed in claim 3, wherein the wall thickness of walls of the high-strength third portion is larger than the wall thickness of a remainder of the flat section.

6. The floor member as claimed in claim 1, wherein the rigidity of the respective sections of the floor member is determined by shapes of the respective cross-sectional configurations and a shape of ribs which extend between an upper wall and a lower wall of at least one of the first, second and third portions of flat section.

7. The floor member as claimed in claim 1, wherein the rigidity of the respective sections of the floor member is determined by a predetermined relationship between the cross-sectional configuration and a lateral width of the respective section of the floor member.

8. The floor member as claimed in claim 1, wherein the first portion includes the third relatively high strength portion.

9. The floor member as claimed in claim 1, wherein the rigidity of the floor member varies essentially linearly in the lateral direction of the vehicle.

10. The floor member as claimed in claim 9, wherein the rigidity of the floor member varies linearly proximate a boundary between the adjacent sections of the floor member.

11. The floor member as claimed in claim 1, wherein the rigidity of the floor member changes stepwise in the lateral direction of the vehicle.

12. The floor member as claimed in claim 11, a portion of the floor member wherein the rigidity changes stepwisely proximate a boundary between adjacent sections of the floor member.

13. The floor member as claimed in claim 1, wherein the height of the closed cross-section of the side sill section is higher than the first and second portions of the flat section of the floor member.

14. The floor member as claimed in claim 1, wherein the second portion of the flat section is divided into an outboard sub-portion proximate the side sill section and an inboard sub-portion proximate the tunnel section and wherein the rigidity of the outboard sub-portion is larger than the rigidity of the inboard sub-portion.

15. The floor member as claimed in claim 1, wherein a ground clearance of the first portion of the flat section is greater than a ground clearance of the second portion of the flat section.

16. The floor member as claimed in claim 1, wherein the tunnel section has a single wall construction.

17. The floor member as claimed in claim 1, wherein the tunnel section is adapted so that the deformation thereof occurs only in response to collision energy produced by an end-on vehicular collision.

18. A frame structure for a vehicle comprising:
- a front segment arranged at a forward end of the vehicle and a rear segment arranged at a rear end of the vehicle;
- a roof segment disposed between the front and rear segments;
- a pair of body side segments disposed on left and right sides of the vehicle and connected to at least one of the front segment, the rear segment and the roof segment; and
- a floor segment connected with the front segment, the rear segment and the body side segments, the floor segment including an extruded floor member having extrusion features which have at least partially closed cross-sections extending in a fore-and-aft direction of the vehicle, wherein the floor member includes:
- a tunnel section;
- side sill section spaced laterally from the tunnel section; and
- a flat section disposed between the tunnel section and the side sill section, the flat section having a first flat portion, a second flat portion and a third high-strength portion between the first and second flat portions; and
- wherein a rigidity of the side sill section with respect to structural deformation in the longitudinal direction of the vehicle is greater than a rigidity of the tunnel and flat sections,
- wherein a rigidity of the second flat portion in the lateral direction of the vehicle is smaller than the rigidity of the side sill section in the lateral direction of the vehicle, and
- wherein a rigidity of the first flat portion in the lateral direction of the vehicle is substantially similar to the rigidity of the second flat portion in the lateral direction of the vehicle.

19. The frame structure as set forth in claim 18, wherein the rigidities are adjusted by adjusting the closed cross-section configuration shapes laterally across the floor member and adjusting a thickness of walls comprising the respective sections.

20. The frame structure as set forth in claim 18, wherein the rigidities are adjusted by adjusting a thickness of walls of the respective sections.

21. A frame structure for a vehicle comprising:
- an extruded side sill section; and
- an extruded flat section disposed inboard of the side sill section, the flat section having a first portion and a second portion, the first and second portions being separated by a relatively narrow elongate high-strength portion, the flat section being disposed adjacent the side sill section so that the second portion is located outboard of the first section,
- wherein the longitudinal rigidity of the side sill section part in the longitudinal direction is higher than the flat section, the lateral rigidity of the second portion of the flat section in the lateral direction of the frame structure is smaller than the lateral rigidity of the side sill section, and the lateral rigidity of the first portion of the flat section is substantially equal to the lateral rigidity of the second portion of the flat section.

22. A frame structure for a vehicle as set forth in claim 21, further comprising a tunnel section which is disposed inboard of the flat section and located adjacent the first portion of the flat section, the tunnel section extending longitudinally along the length of the extruded flat section.

23. A frame structure for a vehicle as set forth in claim 21, wherein each of the extended side sill section and the extruded flat section have closed cross-sectional extrusion features of predetermined configurations and are parallel to the longitudinal axis of the vehicle.

* * * * *